US008691093B2

(12) United States Patent
Green

(10) Patent No.: US 8,691,093 B2
(45) Date of Patent: Apr. 8, 2014

(54) ANAEROBIC WASTE TREATMENT APPARATUS

(75) Inventor: Troy M. Green, Kennewick, WA (US)

(73) Assignee: J-U-B Engineers, Inc., Boise, ID (US)

( * ) Notice: Subject to any disclaimer, the term of this patent is extended or adjusted under 35 U.S.C. 154(b) by 561 days.

(21) Appl. No.: 12/958,338

(22) Filed: Dec. 1, 2010

(65) Prior Publication Data

US 2011/0132821 A1 Jun. 9, 2011

Related U.S. Application Data

(60) Provisional application No. 61/266,904, filed on Dec. 4, 2009.

(51) Int. Cl.
*C02F 3/28* (2006.01)

(52) U.S. Cl.
USPC .......................... 210/603; 210/615; 210/150

(58) Field of Classification Search
USPC ................ 210/603, 615, 616, 617, 150, 151
See application file for complete search history.

(56) References Cited

U.S. PATENT DOCUMENTS

| 4,005,010 | A | * | 1/1977 | Lunt | 210/615 |
| 4,336,135 | A | * | 6/1982 | Price | 210/151 |
| 4,561,974 | A | * | 12/1985 | Bernard et al. | 210/151 |
| 4,582,600 | A | * | 4/1986 | Atkinson et al. | 210/151 |
| 4,714,547 | A | * | 12/1987 | Willinger | 210/167.22 |
| 5,228,995 | A | * | 7/1993 | Stover | 210/603 |
| 5,746,919 | A | * | 5/1998 | Dague et al. | 210/603 |
| 5,772,887 | A | * | 6/1998 | Noah et al. | 210/617 |
| 6,254,775 | B1 | * | 7/2001 | McElvaney | 210/603 |
| 6,555,359 | B2 | * | 4/2003 | Cummings | 435/267 |
| 7,244,355 | B2 | * | 7/2007 | Green | 210/150 |
| 7,374,683 | B2 | * | 5/2008 | Buelna et al. | 210/603 |
| 7,491,325 | B2 | * | 2/2009 | Kulick et al. | 210/150 |
| 2002/0179511 | A1 | * | 12/2002 | Wofford | 210/151 |
| 2003/0075501 | A1 | * | 4/2003 | Wilkie | 210/615 |
| 2007/0251880 | A1 | * | 11/2007 | Herding et al. | 210/603 |
| 2008/0073256 | A1 | * | 3/2008 | Tezuka et al. | 210/153 |
| 2009/0014380 | A1 | * | 1/2009 | Houck | 210/417 |

FOREIGN PATENT DOCUMENTS

| CA | 2603466 | | 10/2006 |
| GB | 2160856 | A * | 1/1986 |
| JP | 63-214394 | A * | 9/1988 |
| JP | 1-236994 | A * | 9/1989 |
| JP | 2000-317483 | A * | 11/2000 |
| JP | 2005-131585 | A * | 5/2005 |

* cited by examiner

*Primary Examiner* — Fred Prince
(74) *Attorney, Agent, or Firm* — Workman Nydegger

(57) ABSTRACT

An anaerobic waste treatment apparatus comprises a container wherein randomly oriented bio-film media are disposed. An example waste treatment apparatus includes a container and optionally has at least two zones of bio-film media that are disposed within the container. In one example, the bio-film media includes torus-shaped materials, or other materials with voids therein, and the container is a dug out portion of earth. Moreover, the anaerobic waste treatment apparatus may additionally comprise a waste pump that is coupled to a waste pipe and configured to introduce waste into the container at one or more locations. When two zones are included, one zone may be randomly oriented, while a proximate zone may be substantially horizontal and/or an organized zone. The random zone may also have a transition layer thereon that supports the organized zone or that provides an interface between the organized and random zones.

21 Claims, 9 Drawing Sheets

ANAEROBIC WASTE TREATMENT APPARATUS

CROSS-REFERENCE TO RELATED APPLICATIONS

This application claims the benefit of, and priority to, U.S. Application Ser. No. 61/266,904, filed on Dec. 4, 2009 and entitled "WASTE TREATMENT APPARATUS," which application is expressly incorporated herein by this reference in its entirety.

BACKGROUND

1. The Field of the Invention

The present application generally relates to waste treatment and gas production. More particularly, the present application relates to an organic waste treatment apparatus, and more particularly still to arranging of bio-film media within a waste treatment apparatus, a method of creating the arrangement of bio-film media, and the production of gas using the waste treatment apparatus.

2. Background and Related Art

The treatment of organic waste has been implemented for many years. Recently, however, organic waste treatment has become more popular as a mechanism for generating energy due at least in part to the volatile cost of traditional energy sources. Indeed, when the volatile cost of the traditional energy sources is combined with the added concern of the impact that such traditional energy sources may have on the environment, organic waste treatment may increasingly be looked at as a viable alternative.

Unlike traditional energy sources, organic waste treatment generates energy from a renewable energy source, namely organic waste such as animal waste or waste from processing plants dealing with organic materials. Moreover, organic waste treatment processes can be implemented relatively simply by harnessing the biogas products of organic waste that are produced naturally, thereby allowing organic waste treatment processes to use bacterial within the products to break the waste down and produce materials that are usable for energy or other purposes. The renewable and environment friendly nature of the organic waste treatment process to produce gas that may be converted to gas suggests that organic waste treatment may be a long term energy solution.

There are various methods to treat organic waste. One such method requires the degradation of the organic waste, which ultimately produces methane gas, carbon dioxide and mineralized nutrients. The degradation process relies on bacteria growth which, in turn, facilitates the degradation process. Unfortunately, bacteria growth can be a slow process, thus prolonging the time it takes to treat organic waste and create the methane gas which can subsequently be used to create energy.

Conventional media structures may be made up of various materials sometimes referred to as bio-film media. Regardless of the form such bio-film media takes, traditional treatment apparatus require all the bio-film media be positioned in a highly organized arrangement. Indeed, such organization has been desired to provide clear paths through which gas may be released. Notably, however, the highly organized arrangements of bio-film media generally require a significant amount of construction time, leading to a higher overall cost to produce an organic waste treatment apparatus. The higher upfront cost limits the economic viability of organic waste treatment by provoking energy producers and consumers to choose traditional energy sources instead of investing in the organic waste treatment infrastructure.

In theory, the upfront cost could be controlled by reducing the size of the waste treatment apparatus, which would in turn reduce the cost to construct the waste treatment apparatus and the time arranging the bio-film media. However, a smaller waste treatment apparatus reduces the amount of energy that the waste treatment apparatus is capable of producing, again making a waste treatment apparatus a potentially less commercially viable energy solution relative to other energy options.

Accordingly, what is needed is a waste treatment apparatus that can be adapted for use at any desired size, and which allows reduced upfront costs while also providing for the efficient capture of produced gas or other products. Additionally, it is also needed to stabilize a waste stream for alternative uses.

BRIEF SUMMARY

Embodiments of the present invention relate to apparatuses and methods configured to create a cost-efficient waste treatment and/or energy production system that is capable of producing energy comparable to conventional waste treatment apparatuses, but with reduced costs. In particular, example embodiments relate to an anaerobic waste treatment apparatus that includes a container and at least two zones of bio-film media that are disposed within the container. In some cases, the apparatus has lowered upfront cost as one or more of the layers in the container are efficiently arranged by randomly orienting bio-film media. In one example, the bio-film media includes tires and the container is a dug out portion of earth. Moreover, the waste treatment apparatus may additionally comprise a waste pump that is coupled to a waste pipe and configured to introduce untreated, partially treated, new, or recycled waste into the container at one or more locations.

In another example embodiment of the invention, a waste treatment apparatus comprises a container and bio-film media within the container. The bio-film media is arranged in an organized zone and a random zone which is adjacent the organized zone. Again, in this embodiment, the bio-film media may be tires. The organized and random zones may be various sizes and configurations and incorporate various sizes of tires.

In still another example embodiment, a method of arranging bio-film media in a waste treatment apparatus comprises creating a plurality of zones within a container of a waste treatment apparatus. Creation of the zones themselves can include creating a first zone of bio-film media and a second zone of bio-film media. At least one of the zones is created by randomly disposing the bio-film media into the container. The bio-film media may be randomly disposed in the container by manually dumping, pushing, or dropping the bio-film media, or by using a variety of machines or other devices or methods.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter. Additional features of the invention will be set forth in the description which follows. The features of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. It will be appreciated that these drawings may illustrate example embodiments in a schematic or diagrammatic nature, and therefore are not necessarily drawn to scale. Understanding that these drawings depict only typical embodiments of the invention, and are not therefore to be considered to be limiting of its scope, the invention will be described and explained with additional specificity and detail through the use of the accompanying drawings in which.

DETAILED DESCRIPTION

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

Embodiments of the invention relate to energy generation, a waste treatment apparatus, arrangements of bio-film media within a waste treatment apparatus, and methods of arranging bio-film media within a waste treatment apparatus.

Figure 1:
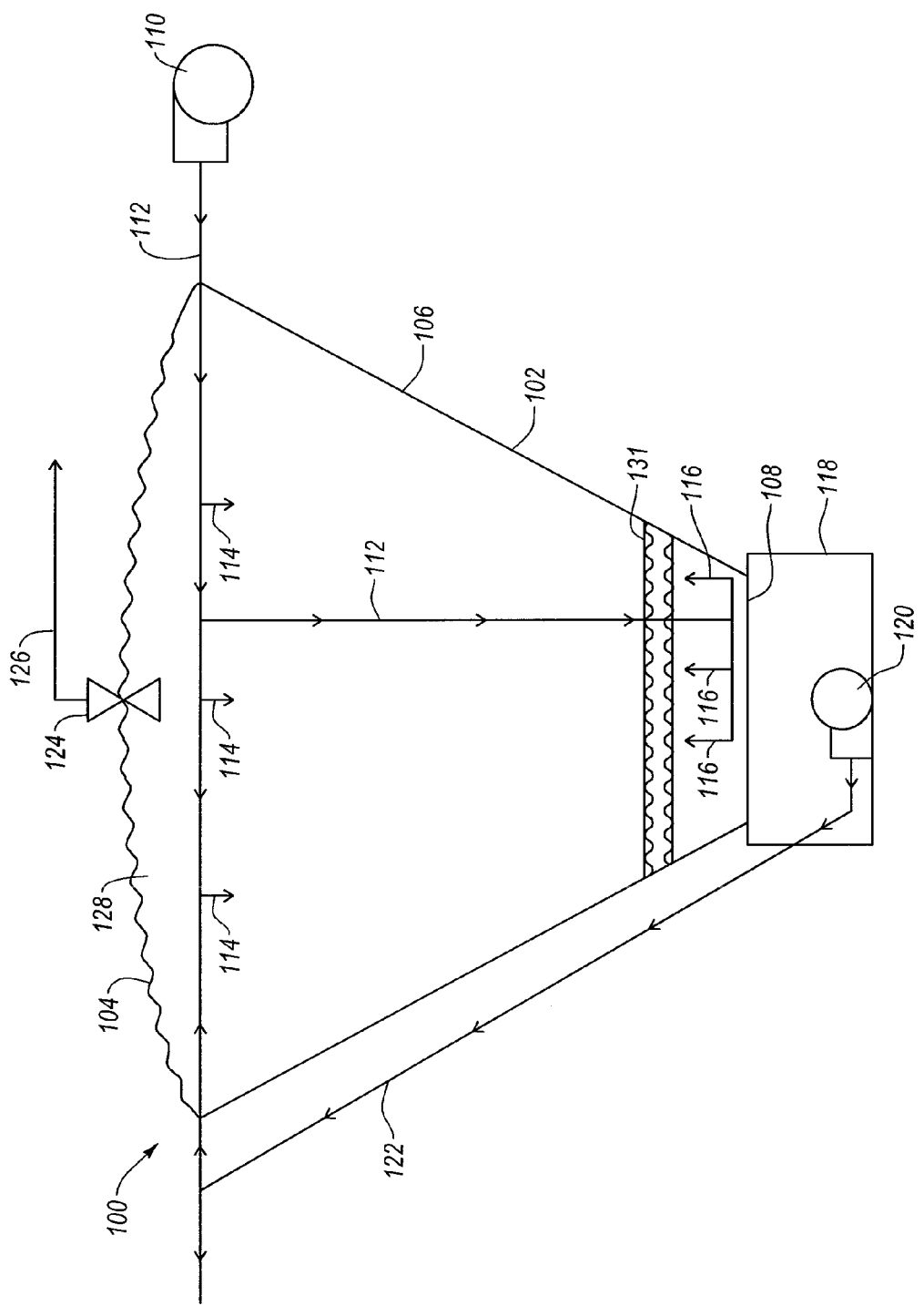
FIG. 1 illustrates a side view of an example embodiment of a waste treatment apparatus.

1. Example Embodiments of a Waste Treatment Apparatus and Gas Production System Now turning to FIG. 1, an example embodiment of a waste treatment apparatus 100 is illustrated. As shown in FIG. 1, the example waste treatment apparatus 100 includes a container 102. In some cases, container 102 may include one or more sides 106, and the number of sides 106 may vary based on the size, shape and construction of container 102. Additionally, container 102 can include, or be attachable to a top cover 104. The cover, in turn, may have an attached valve 124 (e.g., a gas valve) that extends through top cover 104 and is connected to a gas pipe 126, although valve 124 may be attached to other components, or located in other locations. Sides 106 may, in some embodiments, be sloped so as to direct materials to a bottom portion of container 102. For example, as described herein, a sump 118 or other component may be positioned at a bottom of container 102. As sides 106 slope, they can direct the digested waste products towards such bottom where it can be efficiently removed. In addition to sides 106 being sloped, or instead of sides 106 being sloped, a bottom section of container 102 may be sloped to provide a similar effect of directing digested waste products towards sump 118.

Top cover 104 may be any suitable cover. In one embodiment, cover 104 includes one or more insulative materials and/or heating materials. The insulative and/or heating materials may allow container 102 to maintain the waste and water products therein at a particular temperature conducive to anaerobic digestion. For instance, in at least one embodiment, the container 102 may maintain the waste and water products therein at a temperature between about 75 and 115 degrees Fahrenheit, although the temperature within the container 102 may be higher than 115 degrees Fahrenheit or lower than 75 degrees Fahrenheit. In one embodiment, the temperature within the container 102 may be between about 85 degrees Fahrenheit and 95 degrees Fahrenheit.

According to at least some embodiments, the temperature within the container 102 may be controlled at least in part by one or more heating elements. For instance, as noted above, the cover 104 may reduce heat loss within the container 102. Optionally, supplemental heating and/or cooling may be provided. For instance, if the temperature within the container 102 is below a target range, heat may be added to the system using the supplemental heater 131. Alternatively, the supplemental heater 131 may be a cooling element that can remove heat from the container 102.

The supplemental heater 131 illustrated in FIG. 1 is shown schematically to illustrate one possible embodiment of a heating or cooling element. The position and/or configuration of the supplemental heater 131 may be varied in a number of different manners. For instance, the supplemental heater 131 may be inside or outside of the container 102. While inside the container 102, the supplemental heater 131 may extend horizontally along a width of the container, extend circumferentially around one or more portions of the container 102, extend at least partially vertically along a height of the container 102, have another configuration, or any combination of the foregoing. The supplemental heater 131 may also be external to the container 102. For instance, the supplemental heater 131 may be positioned within the sump 118, or may add heat to waste introduced into the container 102.

As will be appreciated in view of the disclosure herein, the use of the supplemental heater 131 is optional. For instance, in a warmer climate, a heating element may not be included, or may be intermittently used. In a warm enough climate, a cooling element may be used. The type of supplemental heater 131 used in connection with the container 102 may also be varied. For instance, supplemental heat may be added by using a boiler, heat exchanger, convection heater, indirect-fired heaters, or other heaters, or any combination of the foregoing. Any such heating element may be powered by electricity, gas, or another method. Indeed, in some embodiments, a heating element may consume some of the gas produced within the container 102 to provide supplemental heating within the container 102.

A waste pump 110 may also be used in connection with container 102. For example, in the illustrated embodiment, waste pump 110 is located outside the container 102 and is connected to a waste pipe 112 which may have one or more waste ports. Waste pump 110 may itself provide all waste into container 102, or there may be multiple pumps. In other embodiments, waste pump 110 is replaced or supplemented by a gravity feed. Moreover, while the waste pump 110 is illustrated as being located outside the container 102, the waste pump 110 may include any suitable pump in fluid communication with the container 102, including a pump inside the container 102.

The illustrated embodiment, for instance, includes three upper waste ports 114 and three lower waste ports 116 extending from the waste pipe 112, although any number of upper and/or lower waste ports may be utilized. In the example embodiment, a sump 118 is also used in connection with container 102. In this case, sump 118 is positioned below container 102 and has a sump cover 108 that is configured to allow residual waste that reaches the bottom of the container to enter sump 118. A sump pump 120 may be located within sump 118 and connected to one or more sump pipes 122. The sump pipe 122 may, in some cases, connect with waste pipe 112. A plurality of bio-film media (not shown) may be arranged throughout the container 102. Additional descriptions of bio-film media will be presented in further detail below.

In operation, waste (not shown) is pumped through waste pipe 112 by waste pump 110. The waste exits waste pipe 112 through upper waste ports 114 and/or lower waste ports 116, and is introduced into container 102 to begin or continue a treatment process. During an exemplary treatment process, gas 128 may be produced and can pass through the bio-film media toward top cover 104 of container 102. As gas 128 reaches top cover 104, gas 128 may be removed from container 102 through gas valve 124. After passing through gas valve 124, gas 128 may be transported through gas pipe 126. The transport of gas pipe 126 may take the gas to a storage tank, a turbine, a burning chamber, or any other suitable location that allows gas 128 to be used, stored, transported, or the like.

While gas 128 is produced from the waste, there remains residual waste that may not be converted into removed gas. This residual waste can eventually seep toward sump cover 108 and into sump 118. Sump pump 120 may then pump the residual waste through sump pipe 122. Such residual waste may be directed to any of a number of different locations. For example, in one embodiment, the residual waste is directed back into container 102 for further treatment processing and anaerobic digestion. Thus, waste introduced into container 102 may include untreated waste as well as recycled or previously treated waste. In another embodiment, residual waste may be directed to another process or storage area. Of course, sump pump 120 and sump pipe 122 may also be configured so that a combination of locations can be supplied with residual waste. For example, a filter may be implemented that filters the residual waste. Following filtering, some of the residual waste may be directed back into container 102, while other residual waste is directed to a different container, process, or location.

As will be appreciated in view of the disclosure herein, waste treatment apparatus 100 in accordance with the various embodiments of the present invention may also have any of numerous configurations. For example, container 102 is an example component that may have various configurations and at least the geometric characteristics, such as the size and/or shape of container 102, may vary from one embodiment to the next. Additionally, FIG. 1 illustrates one example embodiment where container 102 has an inverted cone shape generally illustrated by the inverted trapezoidal cross section. Such a shape may be used, for example, to allow waste and residual waste to drain towards sump 118. Nevertheless, other example container shapes may be used, including cylindrical, rectangular, cubical, spherical or any other shape suitable for the waste treatment process.

In addition to the shape, the size of the container is another geometric characteristic of container 102 that may be varied from one embodiment to the next, while remaining within the scope of the present invention. Container 102 may be a wide range of sizes including containers that are about one hundred feet wide at the widest portion and have a height of about one hundred feet. Conversely, the container may be much smaller having a widest width of less than about five feet and an overall height of about three feet. Of course, various other sizes of containers may be larger or smaller than the foregoing examples depending on a variety of considerations, including the amount of waste to be treated, the desired amount of gas production, the amount of capital and/or materials available for construction of the apparatus, and/or the space available at the location for the apparatus.

Not only may the container geometric configurations vary, but the container material may also vary from one embodiment to the next. In one example embodiment, such as that illustrated in FIG. 1, container 102 can be formed from a basin dug in the earth. In such an example embodiment, sides 106 of container 102 may thus be formed by the dirt, rock, soil, etc. from the earth itself. Additionally, or alternatively, sides 106 may be lined with suitable material. For instance, in one example, a plastic lining or film may coat one or more of sides 106. Any such lining may be formed from a material that fits within the basin. For example, sides 106 may be lined with linings made from concrete, plastic, metal, wood, earthen materials, asphalt, clay, composites, other materials, or any combination thereof. In some embodiments where a lining material is used, sides 106 may have a substantially rigid lining, although in other embodiments a flexible material may be used to line one or more sides 106 of container 102.

While one example embodiment includes an earthen basin in the construction of container 102, it will be appreciated that this is merely one example embodiment and that other embodiments are contemplated. For example, in another embodiment, container 102 is formed from metal, concrete, or another suitable material and takes the form of a tank. Such a tank, or any other suitable container, may be configured to be above ground or, alternatively, the container can be configured to be installed below ground. In other cases, such a tank or container is partially below ground.

With continued reference to FIG. 1, it will also be appreciated that top cover 104 may have any suitable construction and, as the container varies from one embodiment to the next, so too may top cover 104 vary. The size of top cover 104 with relation to container 102, for example, is one way in which top cover 104 may vary from one embodiment to the next. FIG. 1 illustrates one example embodiment where top cover 104 is sized and configured to substantially cover the largest area of the top of container 102. In alternative embodiments, the size of top cover 104 may be configured to cover only a portion of the top of the container. For example, depending on the configuration of container 102, it may be desired to have top cover 104 only partially enclose the top of container 102.

As shown in FIG. 1, the full removal of top cover 104 from container 102 may provide a large access area to the contents of container 102, thus allowing for construction, inspection, and/or maintenance. In addition to the size of top cover 104, the access top cover 104 provides to container 120 may vary from one embodiment to the next. The removal of top cover 104 may provide, for example, only limited access to the container allowing for the introduction of bio-film media into the container along with limited inspection and maintenance. Furthermore, while top cover 104 is illustrated at the top most portion of container 102, it may nonetheless be located at other locations. For example, top cover 104 may be positioned on one side of container 102, or multiple top covers 104 may be used at different locations of container 102.

Top cover 104 may be configured to be removed in various ways to provide container access. As shown in FIG. 1, for example, top cover 104 may be a single piece of material that a worker can partially or fully lift off container 102 in order to gain access. Depending on the size, configuration and/or construction of top cover 104, one or more workers may be able to partially or fully remove top cover 104 manually, or may use a crane or other machinery so as to gain access to container 102. In some embodiments, top cover 104 may be configured with a hinge to facilitate the opening or removing of top cover 104, may have a mechanical device (e.g., a motorized cover remover) that simply rolls back top cover 104, or may otherwise be configured to facilitate removal of top cover 104.

In one example embodiment, top cover 104 is made of an impermeable material that substantially prevents materials (e.g., gas, solid, and/or liquid) from passing through the surface of top cover 104. It will be appreciated, however, that such a material may not be necessary in all embodiments, or a variety of materials may be used for a substantially impermeable or for a permeable surface. For example, the top cover may be made from various materials such as plastics, composites, concrete or metal. In some embodiments, top cover 104 may support gas valve 124 directly, and thus may be a rigid material strong enough to support gas valve 124, while in other embodiments, top cover 104 does not directly support all, or any, of the weight of gas valve 124.

As will also be appreciated in view of the disclosure herein, gas valve 124 may be any suitable valve, and may be selected based on the particular size of waste treatment apparatus 100, the type of gas or other material produced within apparatus 100, the cost of the valve, or based on other configurations. For example, the size of gas valve 124 may range from about one-half inch in diameter to more than eight inches in diameter depending on the volume of gas produced from the waste treatment process. Of course, if more or less gas is produced, larger or smaller gas valves may also be utilized. Further, smaller gas valves may be utilized if more than one gas valve 124 is used for the release of gas from within container 102.

Additionally, a type of gas valve may be selected from any set of suitable considerations, or can be any other control mechanism for gas. In one example embodiment, valve 124 is a linear stem valve, while in another example embodiment, valve 124 may be a rotary valve. Moreover, notwithstanding the type of valve used, valve 124 may be configured to be an on/off type valve or, conversely, may be configured to be a control valve that directly controls the flow of material from waste treatment apparatus 100. In the example embodiment where valve 124 is a control valve, valve 124 may be coupled to other devices such as actuators, flow meters, and/or positioners to facilitate the control of valve 124 relative to the flow rate. Further, while valve 124 may be referred to herein as a gas valve, it may also allow the release of other types of materials. For example, waste treatment apparatus 100 may facilitate the production of a liquid energy material which then may pass through valve 124. Thus, the term "gas valve" is used merely for convenience, but should not limit valve 124 from being used in connection with gasses, liquids, solids, semi-solids, or combinations of the above, indeed, "gas valve" is used generally for a gas control system and is intended to encompass any suitable gas control system regardless of the presence of an actual valve. Furthermore, while an upper position of valve 124 may be desirable in some cases where a gas is produced (e.g., where the density of the produced gas causes it to rise), it will be appreciated that valve 124 may also be positioned at other locations. For example, if a heavy gas, liquid, or solid energy product is produced, it may be desired to position one or more valves at a position lower than that illustrated in FIG. 1.

Not only may the components near the top of the waste treatment apparatus vary, but the lower components of the waste treatment apparatus may also have various configurations. Sump 118, for example, is optional and when present can also be sized, shaped, and/or configured in any of a number of different manners. For example, sump 118 may have a shape that varies. As illustrated in FIG. 1, sump 118 has a generally rectangular shape. Other example sump shapes include, but are not limited to, cubical, spherical, pyramid, cylindrical, trapezoidal, or combinations thereof. In other embodiments, sump 118 is eliminated. For instance, a pump may be used without a sump and can be arranged for use in other alternative configurations.

Sump 118 may further be made from any suitable material. In one example embodiment, sump 118 is formed at least partially from a concrete material, while sump cover 108 is a metal material. In other embodiments, sump 118 and sump cover 108 materials may be any combination of plastics, composites, metals, or concrete. Alternatively, sump 118 may simply be a dug out portion of earth. In still other embodiments, sump 118 may be eliminated. For instance, one or more pumps may be included to generally perform the same function as sump 118.

As illustrated in FIG. 1, sump pump 120 can be included within sump 118. Sump pump 120 may also have various sizes, power characteristics, handling capabilities, etc. depending on a variety of factors such as the amount of residual waste to be pumped out of the sump, the size of sump pipe 122, and the like. Moreover, sump pump 120 may be configured to be a liquids handling pump or, alternatively, in another embodiment, the sump pump may be a solids handling pump. In still another embodiment, sump pump 120 may handle both liquids and solids.

In still other embodiments, there may be two or more pumps. For instance, a first pump may be used near the bottom of sump 118 or container 102 to pump out solid materials that have sunk to the bottom of container 102, such as solid waste materials that have been stabilized and/or neutralized by the waste treatment process occurring within the described waste treatment apparatus. A second pump may be used to handle liquid materials. For instance, sludge or materials may be recycled by being pumped through the second pump and back to the top of container 102, where it is re-introduced into container 102. Further, in some embodiments, the re-introduction of pumped materials may improve efficiency of the waste treatment apparatus. For example, the largest concentration of the bacteria used to break down the waste may generally be found near the bottom of container 102, where the solid materials tend to accumulate. As such, as new material is placed in container 102—whether by pump, gravity feed, or other mechanisms—it may have to also fall a significant distance down container 102 before the most efficient use of the bacteria occurs. However, by combining recycled materials with new materials, the bacteria can be introduced at the top of container 102, thereby allowing the waste treatment process to start immediately and efficiently.

Just as sump pump 120 may vary, waste pump 110 may vary in similar ways. For example, in one embodiment of waste treatment apparatus 100, waste pump 110 is configured to pump a premixed waste slurry. In other embodiments, however, waste pump 110 may be configured to pump a waste mixture with higher or lower percentages of solids.

Regardless of the type of pumps or other fluid control devices (e.g., siphon, venturi, gravity flow, etc.), used in the system, such pumps or other devices may be connected to an output system. For example, in the illustrated embodiment, waste pump 110 is connected to a waste pipe 112 for the output of waste from output pump 110 and to container 102. FIG. 1 shows one example configuration of waste pipe 112 which enters container 102 at about the same location of where top cover 104 meets with container 102. It should be appreciated that this is merely exemplary and that waste pipe 112 may enter container 102 through a side 106 of container 102, through top cover 104, through sump 118, or at any desired location.

As FIG. 1 further illustrates, waste pipe 112 may have a plurality of waste outlets that are configured to deposit the waste from the waste pipe and into the container. In one example embodiment, shown in FIG. 1, waste pipe 112 is configured with three upper waste outlets 114 as well as three lower waste outlets 116. In other example embodiments, waste pipe 112 may lead to more or fewer waste outlets and/or waste outlets with various locations throughout the container. For example, waste outlets may also be located at the sides of container 102, may have only upper waste outlets 114, may have only lower waste outlets 116, may have outlets along the illustrated vertical portion of waste pipe 112, or have any combination of the foregoing. Additionally, instead of a single waste pipe 112, waste pipe 112 may output waste through multiple pipes and/or there may be multiple waste pumps inputting waste through multiple pipes.

In one example embodiment, waste pipe 112 is connected to sump pipe 122. In such a configuration, sump pipe 122 may transport residual waste back into waste pipe 112 and into container 120 for further treatment of the residual waste. Moreover, when sump pipe 112 and waste pipe 122 are connected, block valves or other similar devices (not shown) may be utilized at the respective pipe intersections, or other various locations, to provide a desired system function.

In addition to various pipe configurations, waste treatment apparatus 100 may also include a baffle (not shown) located within the container. Such a baffle may have any suitable size, configuration and construction. For example, an exemplary baffle is described in U.S. Pat. No. 7,244,355, which patent is herein incorporated by this reference in its entirety.

Figure 2A:
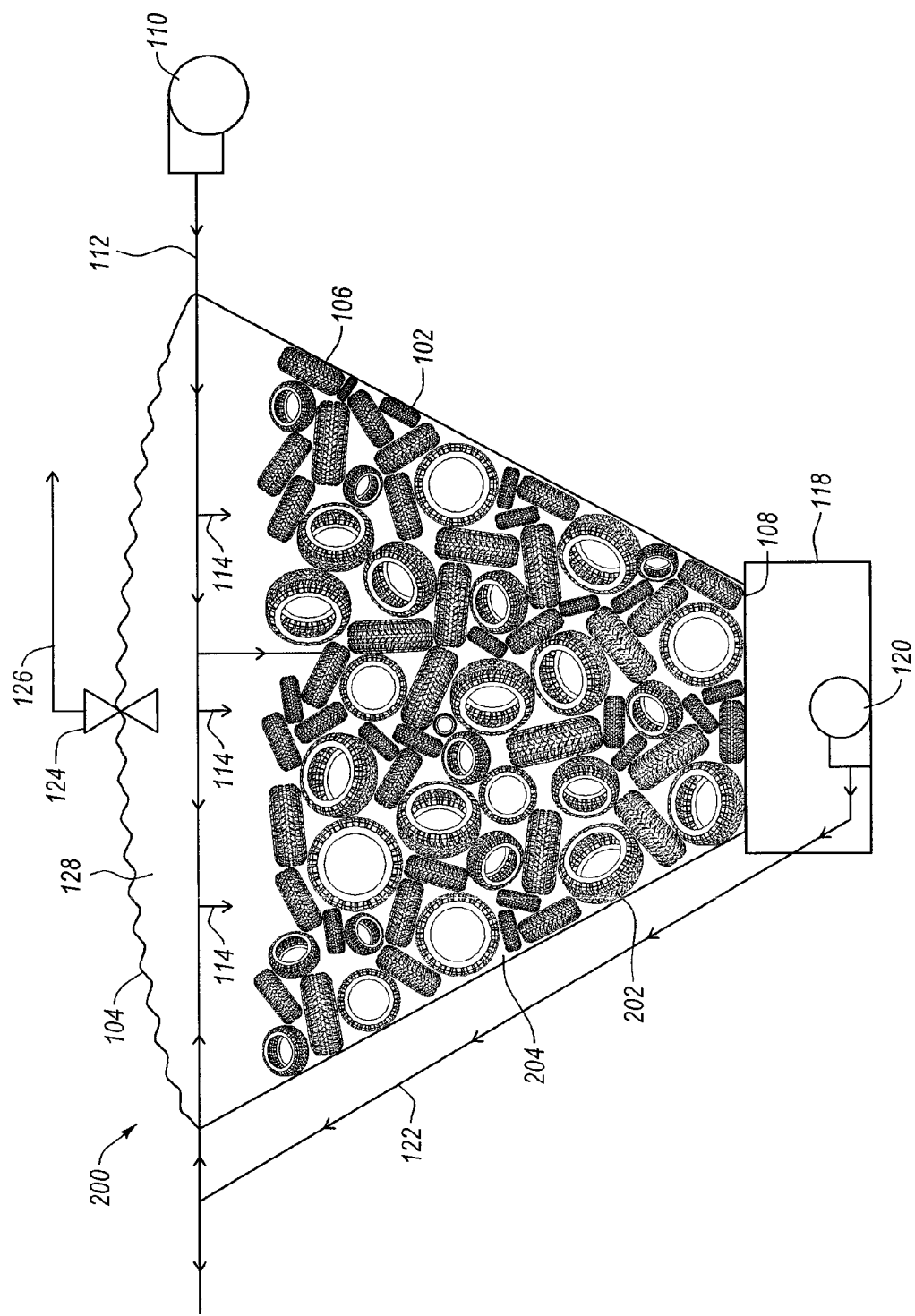
FIG. 2A illustrates a side view of an example embodiment of a waste treatment apparatus with an example arrangement of bio-film media.

Additionally, container 102 can be produced or otherwise formed and fully or partially filed with bio-film media. For example, as illustrated in FIG. 2A, a plurality of bio-film media 202 may be placed within a container 102, and substantially fill container 102. According to one aspect of the invention, bio-film media 202 may be included within container 102 to facilitate the production of energy from material (e.g., waste) that is introduced into container 102. For example, bio-film media 202 may provide an attachment platform for bacteria to grow and support degradation of waste that occurs within the waste treatment process occurring within container 102. To facilitate such production, it will be appreciated that any of a variety of bio-film media 202 having a wide range of different characteristics may be utilized.

As illustrated in FIG. 2A, an apparatus 200 may be similar to apparatus 100 (FIG. 1), and may be wholly or partially filled with bio-film media 202. In some embodiments, additional materials besides bio-film media 202 and any waste or water may be placed within apparatus 200. For instance, when wholly or partially filled with bio-film media 202, sump 118 may also become wholly or partially covered, as illustrated in FIG. 2A. In some embodiments, it may be desirable to access sump 118 while apparatus 200 remains in use. Accordingly, in other embodiments, an access to sump 118 may be provided. In still other embodiments, it may be desirable to secure the bio-film media 202 at a particular location. Accordingly, in other embodiments, securement devices may be provided.

Figure 2B:
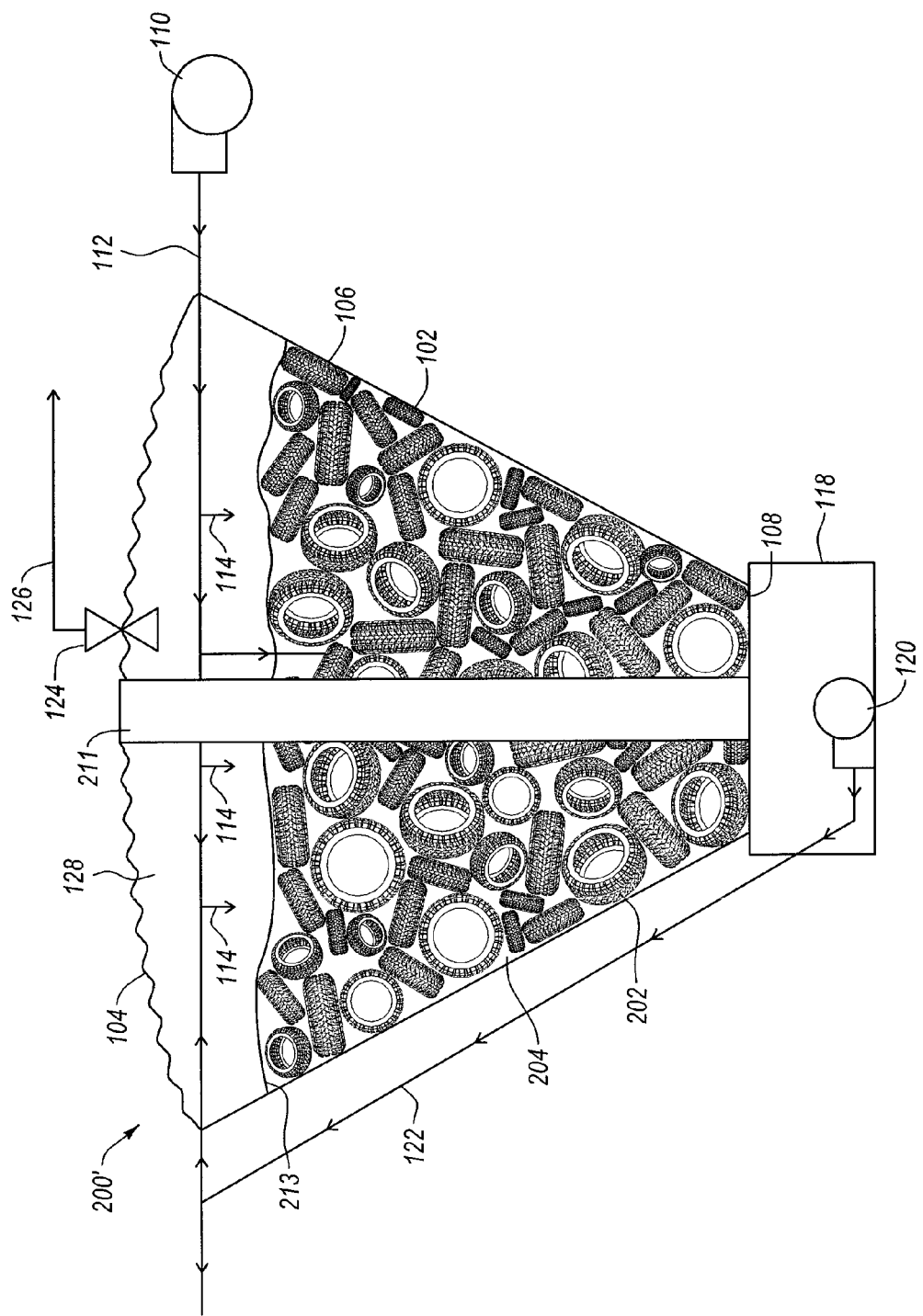
FIG. 2B illustrates a side view of an example embodiment of a waste treatment apparatus with a sump access and an example arrangement of bio-film media.

For instance, FIG. 2B illustrates an apparatus 200' that is similar to apparatus 200 of FIG. 2A, but also includes bio-film media 202, an access port 211, and a restraint member 213 within container 102. Access port 211 may be used for any number of purposes and can have any of a number of different constructions. In the illustrated embodiment, for instance, access port 211 may extend approximately vertically from top cover 104 to sump cover 108. In one embodiment, such access port 211 may allow a person or equipment to move from top cover 104 towards the bottom of container 102 and/or towards sump 118, even while apparatus 200' is in operation. For instance, if sump pump 120 or some other component in or near sump 118 becomes clogged, non-operational, or otherwise needs attention, a person or equipment may be moved through access port 211 toward sump 118, and can then perform maintenance, diagnose a problem, replace or repair a component, or otherwise to inspect or work on apparatus 200'.

Access port 211 may have other purposes as well. For instance, access port 211 may provide a surface on which waste materials can attach. By way of illustration, as waste materials are digested, waste may concentrate on an interior and/or exterior surface of access port 211. The concentrated, digested waste may be collected and removed from such a surface. In one embodiment, the concentrated, digested waste may have additional purposes such that it can be removed from apparatus 200' and used as fertilizer or for other purposes. In still other embodiments, access port 211 may assist in the decanting of water from a portion of container 102 so that the decanted water may be used as, for example, irrigational water. Accordingly, access port 211 may have a variety of uses and purposes, including sludge removal, reintroduction, and/or recycling, water decanting, or other uses, or any combination thereof.

Although access port 211 is illustrated in FIG. 2B as providing a single, vertical access that is substantially centered within container 102, it should be appreciated that this is merely one example of an access port, and further schematically represents other types of access ports that may be utilized. For instance, access port 211 may include a pipe or tube extending vertically, an access port extending at an angle (e.g., along or parallel to sides 106), or multiple access ports extending in any suitable direction. Accordingly, one or more pipes, tubes, or other structures may be used to provide access ports that singularly or collectively provide a variety of different functions.

As further noted above, apparatus 200' may also include, in some embodiments, one or more restraint members 213. A restraint member 213 may, for example, restrain or secure bio-film media 202 in a desired location or position. By way of example, as apparatus 200' of FIG. 2B is created, bio-film media 202 may be placed therein in random, pseudo-random, or other arrangements, or in a combination thereof. Water may then be added to container 102, which can cause bio-film media 202 to become at least partially buoyant. A restraining member 213 may be secured in place before the addition of the water, or before the addition of all water, to maintain bio-film media 202 at a desired location or density. For instance, a fabric, mesh, wire, or other material, a set of horizontal pipes, weights, or other elements or materials may be placed at a top portion of bio-film media 202 and counter the buoyant forces to restrict the upward movement of bio-film media 202.

It should also be appreciated in view of the disclosure herein that restraint members 213 need not merely act to counter buoyant forces, but can also include other types of restraints and be used for other purposes. For example, a set of bio-film media 202 may be arranged in a particular arrangement and then secured together with a restraint member to allow the various elements of the set of bio-film media 202 to maintain relative positions within the set. In other embodiments, multiple restraint members 213 may be added. For instance, restraint members 213 may be positioned at a location between the top of bio-film media 202 and the bottom of container 102 so as to counter buoyant forces of less than the full number of bio-film media 202 within container 202, or multiple layers of restraint members 213 may be used at different vertical locations. In still other embodiments, restraint members 213 may prevent or restrict horizontal or other movement of bio-film media 202 within container 102.

FIGS. 2A and 2B thus illustrate various example embodiments of apparatus 200, 200' that are contemplated as being within the scope of the present invention. It should also be appreciated that components of apparatus 200 and/or apparatus 200' may be combined in any suitable manner. For instance, it is not necessary that apparatus 200' include both access port 211 and restraint member 213. Moreover, apparatus 200' may include a single access port 211, a single restraint member 213, multiple access ports 211, multiple restraint members 213, or other arrangements or configurations of access ports 211 and/or restraint members 213, or any combination thereof. With regard to the following discussion, and particularly with regard to FIGS. 2A and 3-7C and the discussion related thereto, the various waste treatment apparatus are not shown as including access port 211 or restraint member 213. It should be appreciated that the exclusion of access port 211 and/or restraint member 213 from such figures and discussion is merely to simplify the discussion related thereto and to avoid obscuring other aspects of the present invention. Indeed, any of such apparatus may also include one or more access ports 211 and/or restraint members 213 as described herein.

While the methods and apparatus described herein are primarily described with regard to the use of a container and bio-film media for a waste treatment and gas production system, it should be appreciated that other aspects are also contemplated. For instance, in one embodiment, the material being treated and/or used to produce gas or energy is animal waste, although in other embodiments other organic materials may be treated. For instance, cellular materials or byproducts of food production plants (e.g., vegetable tailings) may be used in addition or as an alternative to animal waste. Any other suitable material that may be used in a biodigester or treatment apparatus for the production of gas, whether or not organic or even a waste product, may also be used. Indeed, in some embodiments, multiple types of waste or other materials are co-fed into an energy production system as contemplated herein. Accordingly, as used herein, the term "waste" is contemplated as broadly including materials that may be used to produce energy within the contemplated apparatus and systems. Such term should include animal and/or other organic materials introduced into the systems, regardless of whether such materials are byproducts of another process, or whether such materials are targeted specifically for use within the waste treatment and energy production apparatus.

Regardless of the specific type of material put into use in a waste treatment apparatus described and contemplated herein, as such materials are treated, the organic or other materials may be stabilized and can condense towards a bottom of the container. Such materials, when removed from the container, can have high concentrations that allow them to be used as fertilizer, and can optionally be removed and composed or dried for such purposes. Additionally, water that is decanted off the top of the container may still include some bacteria or pathogens, but may have been sufficiently treated that it can be used for irrigational or other purposes. In some cases, a waste treatment apparatus may digesting of the waste materials in a manner that controls the odor of the waste byproducts (e.g., animal waste). As such, operation of a treatment apparatus as described herein may qualify the operation for carbon credits. Further, while water may be introduced with the waste, in some embodiments, the water is waste water (e.g., from a processing plant) such that solid waste and/or waste water may be treated.

2. Bio-Film Media

As noted previously, bio-film media may be configured to provide an attachment surface for bacteria or other components that act in breaking down the waste within a waste treatment apparatus. Bio-film media 202 may thus have any of a number of different sizes, shapes, configurations, materials, or combinations thereof. In one example, for instance, bio-film media 202 is made from a rubber material, whereas in other embodiments plastics, composites, organic materials, or combinations thereof may be utilized.

The specific structure of bio-film media 202 in FIGS. 2A and 2B can vary and may be any suitable type of bio-film media. For instance, the shape of bio-film media 202 may be varied and could optionally be selected at least in part by considering the amount of surface area provided by bio-film media 202 and/or the effect the shape of bio-film media 202 has on the sludge age. In this manner, apparatus 200 can be produced to potentially maximize the surface area for bacteria attachment and/or maximize the break-down of the waste by increasing the sludge-age so that the waste can remain in or on one or more of bio-film media 202 for a period of time that allows the waste to be broken down. In one example embodiment, the shape of bio-film media 202 is a donut-type shape, or other torus-shape. Such a shape may, for example, provide a void into which sludge and waste materials may accumulate and remain over time while the bacteria that attaches to the interior walls of the media anaerobically digests material.

Any material that has a void may thus be used, such as tubes, containers, and the like. Other example bio-film media shapes include, but are not limited to, squares, rectangles, boxes, cubes, spheres, or other forms. Multiple different shapes and/or sizes of bio-film media 202 may also be utilized within the same container 102, as can include different materials for bio-film media 202. In one embodiment, bio-film media 202 includes rubber-like materials having a torus shape or other shape with a void, such as an automobile or other tire. In another embodiment, bio-film media 202 alternatively or additionally includes partial sections of torus shapes (e.g., tires cut in half, quarters, or other segments). In still another embodiment, an alternative or additional type of bio-film media may include a plastic material that has a torus shape or other shape with a void. For instance, used plastic jugs may be used, and may even be crushed or melted together to form desired shapes. Bio-film media 202 may thus include natural media or manufactured media, and can include a single type, shape, or material of media, or can include multiple types, shapes, and/or materials of media.

While bio-film media 202 may be manufactured or obtained specifically for use in apparatus 200, other embodiments contemplate the use of bio-film media 202 that is a preexisting article and that is subsequently then used as bio-film media 202. As such, when bio-film media 202 is a re-use of a preexisting article, the size and/or shape of bio-film media 202 may be at least partially determined by other considerations (e.g., the considerations leading to use of the article's primary purpose). For example, in one embodiment, bio-film media 202 is made up of one or more tires (e.g., automobile tires), and such media may be whole or partial when used as bio-film media in container 102. As noted previously, the shape of bio-film media 202 may be based on such media being a container of some sort, or based on other considerations of a prior use.

The size of any tires used for the bio-film media may vary from one embodiment to the next, as could the size of other types of bio-film media such as plastic containers, tubes, pipes, or any other type of bio-film media. For example, some tires may be larger as they correspond to primary use with a truck or tractor, while other example tires are relatively smaller due to their design for compact cars, motorcycles, wheelbarrows, and the like. Moreover, the same waste treatment apparatus (e.g., apparatus 200) may contain various different sizes of tires within the same container 102, or various types of different media within container 102. Further, partial portions of tires, such as tire halves (e.g., horizontally or vertically cut halves), tire quarters, or tire tread, may also be used as the bio-film media. These partial portions may also be intermixed with whole tires and/or other media in the same waste treatment apparatus.

3. Example Embodiments of Bio-film Media Arrangements

In addition to the various bio-film media characteristics discussed above, the arrangement of bio-film media within a container is another way in which the bio-film media may vary from one embodiment of the waste treatment apparatus to the next. For example, returning to FIG. 2A, an example waste treatment apparatus 200 with one example arrangement of bio-film media 202 within container 102 is illustrated. In FIG. 2A, bio-film media 202 is arranged randomly such that the bio-film media is oriented and stacked in a substantially random fashion. Moreover, as shown in FIG. 2A, the bio-film media does not have any highly or loosely organized layering scheme. Thus, in contrast to structured layers that provide structured paths for gas to follow, container 102 provides air pockets 204 in random locations within the random arrangement of bio-film media 202. Such random air pockets may allow gases to build and eventually rise to the top of container 102, while also facilitating draining of residual waste toward sump 118.

It will also be appreciated in view of the disclosure herein, that once bio-film media 202 is placed within container 102 and used in a waste treatment process therein, bio-film media 202 does not necessarily remain in the same orientation or configuration in which it was originally placed. For example, over time all or some of bio-film media 202 may degrade, possibly at different rates, thereby causing a sinking and/or shifting of bio-film media. In addition, while highly or even loosely structured bio-film media 202 may provide consistent paths for produced gas to follow within container 202, the random orientation of bio-film media 202 and the randomly placed air pockets 204 may not provide such structure. As a result, as gas is produced and collected within air pockets 204, the pressure within air pockets 204 may build. When the pressure reaches a certain level, a release may be necessary. Such a release may be caused by the pressure itself which moves bio-film media 202 as the gas finds its way to the next air pocket 204. The release of such gas from within container 102 may thus move bio-film media 202 from an initial position or orientation. Indeed, continual build-up and release of gas within the randomly placed bio-film media 202 may over time lead to the settling of bio-film media 202. Thus, while bio-film media 202 may initially be placed into container 102 in a random or other fashion, and used in the waste treatment process while in random or other positions, the waste treatment process itself may, over time, cause bio-film media 202 to settle into a loosely organized arrangement. When in the loosely organized arrangement, air pockets 204 may be less random and provide more direct paths for the produced gas to flow.

In this manner, the waste treatment process that occurs within container 102 may thus itself be utilized to arrange and/or layer bio-film media 202. Accordingly, in contrast to conventional media structures that are produced with the great expenditure of time and money to set-up a structure that initially provides an organized pattern of bio-film media, randomly placed bio-film media may ultimately provide approximately the same benefit as over time the process itself can organize the bio-film media. Thus, by initiating the waste treatment process with randomly oriented bio-film media, a considerable savings can be obtained as a result of the reduction of time and effort to provide an initial organization of the bio-film media, while also ultimately obtaining the same, or nearly the same, efficiencies when compared with a process started with bio-film media that is already organized and arranged.

Figure 3:
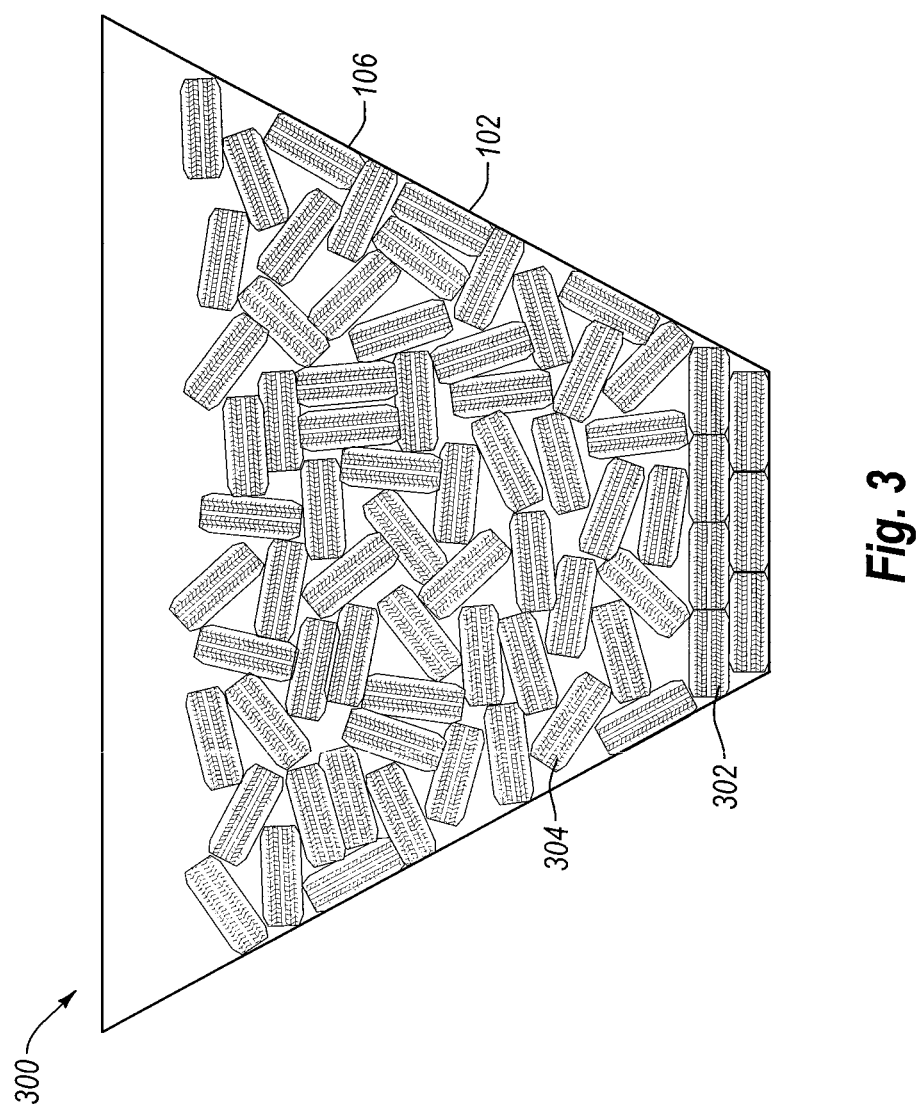
FIG. 3 illustrates a side view of an example embodiment of a waste treatment apparatus with an example arrangement of bio-film media.

FIG. 3 illustrates an additional example embodiment of the arrangement of bio-film media within a waste treatment apparatus 300. As illustrated in FIG. 3, there may be one or more different zones within container 102, and the one or more zones can have different types of bio-film media, different types of organizations of bio-film media, have different restraint members applied, or have other differences. For example, in the illustrated embodiment, an organized zone 302 of bio-film media has been placed and arranged at the bottom of container 102. In the illustrated embodiment, organized zone 302 may include bio-film media 202 that is arranged in substantially horizontal rows. A random zone 304 that contains randomly oriented bio-film media 202 may also be included within container 102 (e.g., above organized zone 302). Although not a necessary component, organized zone 302 may assist to facilitate the draining of residual waste into sump 118. As used herein, a "zone" may refer to any collection of bio-film media. Thus, while the illustrated embodiment shows an organized zone that is generally horizontal, a zone need not correspond to a horizontal section, vertical section, or any particularly shaped section of media. For example, in one embodiment, a zone corresponds to a grouping of bio-film media 202 that is placed in container 102 at about the same time, regardless of the ultimate location of such media as part of the waste treatment apparatus.

Organized zone 302 may vary from one embodiment to the next, and may even be eliminated entirely. For example, the number of layers of bio-film media within organized zone 302 may vary. FIG. 3 shows one example embodiment where organized zone 302 contains two layers of bio-film media arranged in substantially horizontal rows. In other example embodiments, an organized zone may contain more or fewer layers of bio-film media. Furthermore, while the substantially horizontally rows illustrated in FIG. 3 have an offset construction in which an article of bio-film media of a lower row is not necessarily centered with an article of bio-film media on an immediately higher row, other embodiments may have different configurations. For example, in other embodiments, a stacked configuration may be implemented that aligns, or substantially aligns, central axes of articles of bio-film media on adjacent rows.

Just as the number of layers within the organized zone may vary, the sizes of bio-film media within each layer may vary. For example, in an embodiment where the bio-film media is tires, one layer may contain a plurality of one size of tire while the next adjacent layer may contain a plurality of a different size of tire. Thus, zones may be separated based on the size or type of bio-film media utilized. Moreover, the bio-film media within a single layer may vary. For instance, various different sizes of tires may be contained within the same layer of bio-film media.

Further, while organized zone 302 is shown as being generally horizontal, such an arrangement is merely exemplary. For instance, as noted previously, container 102 may include a generally sloped bottom. Accordingly, in such an embodiment, an organized zone may have highly organized bio-film media that generally follows the sloped contour of container 102. Of course, other horizontal, vertical, or angled organizations may be used to organize bio-film media 202.

To place and/or maintain bio-film 202 media in organized zone 302 in substantially horizontal rows, or in another desired configuration, bio-film media 202 one or more restraint members (not shown) may be used. For example, a restraint member may be used to couple one bio-film medium to an adjacent bio-film medium. In an embodiment where bio-film media 202 is tires, the tires within the organized zone may be coupled together with mechanical fasteners, such as with a bolt and nut or chains. In one example embodiment, the tires may only be coupled to tires within the same layer. In another example embodiment, the tires may be coupled to tires in adjacent rows, or a tire may be coupled to both tires within the same row and tires in adjacent rows. In still another embodiment, a wire, mesh, fabric, series of pipes, or other restraint member may be placed along a series of bio-film media 202 to collectively restrain an organized zone, without necessarily attaching each individual medium to another.

Organized zone 302 of bio-film media may not necessarily be located on the bottom of the container. For example, and as illustrated in the organic waste treatment apparatus 400 of FIG. 4, an organized zone 402 of bio-film media may exist as a top or upper layer that is positioned above a random zone 404. In some embodiments, a transition zone 406 may be located between an organized zone 402 and a random zone 404 to facilitate the arrangement of the organized zone 402 above the random zone 404.

As discussed above, an organized zone 402 and/or random zone 404 may have various embodiments. Likewise, a transition zone 406 may also vary from one embodiment to the next. In one example embodiment, transition zone 406 may use different sizes of bio-film media to create a loosely organized or substantially horizontal foundation to support the arrangement of the organized zone on top of the transition zone. In another example embodiment, the bio-film media of transition zone 406 may be manually arranged to provide a substantially level foundation to support organized zone 402, but without the same structure, organization, and/or characteristics of organized zone 402.

Figure 4:
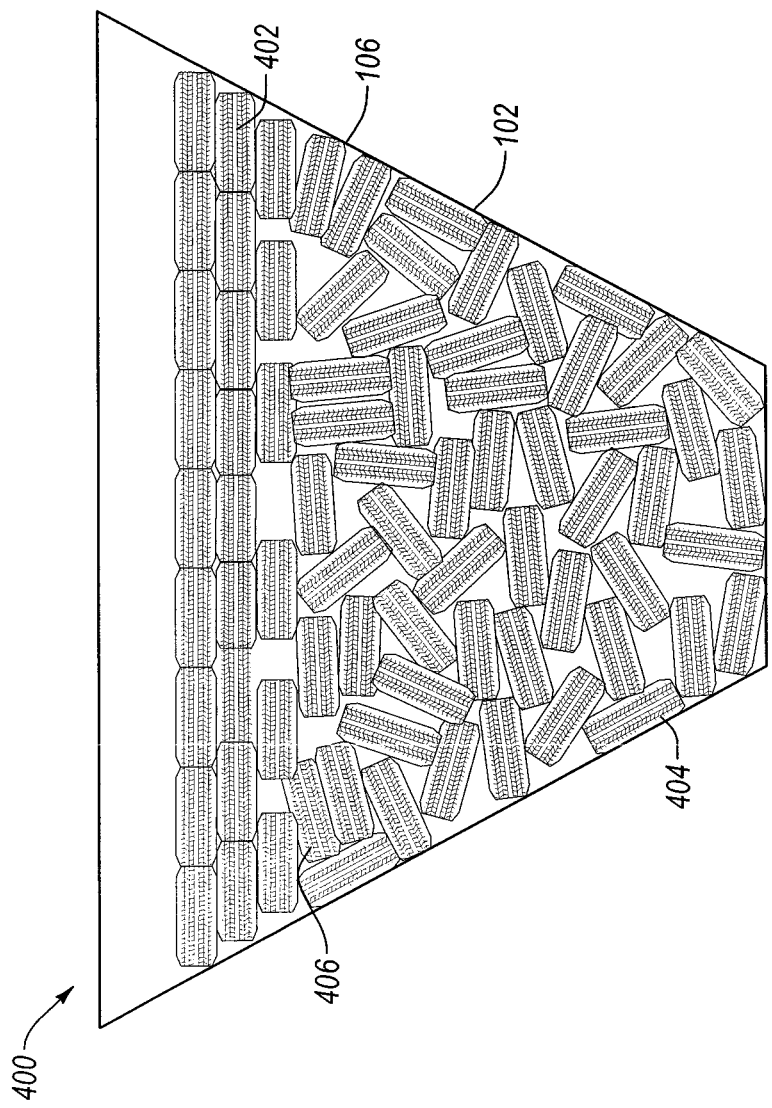
FIG. 4 illustrates a side view of an example embodiment of a waste treatment apparatus with an example arrangement of bio-film media.

In FIG. 4, for instance, random zone 404 may be formed by dumping, throwing, or otherwise placing the bio-film media into container 102, and without regard to the ultimate placement or location for use of the bio-film media as the waste treatment process begins. Once the articles of bio-film media thus come to rest within container 102, those constructing apparatus 400 can leave all such articles in that random position. In some embodiments, such as that in FIG. 4, those constructing apparatus 400 may facilitate use of organized zone 402. For example, after creating random zone 404, the workers may re-arrange a select few of the articles of bio-film media to create transition layer 406. For instance, after random zone 404 has been created, the workers may rearrange those articles that are on the top of random zone 404 and that are in a substantially non-horizontal position, while not-re-orienting, or while substantially only shifting the location of other articles of bio-film media that are already substantially horizontal. In this manner, transition layer 406 may be created by, for example, re-orienting only the worst offenders (i.e., the articles of bio-film media most out of alignment with a desired organized zone). In this manner, considerable time and expense can be saved in the construction of apparatus 400 as fewer articles of bio-film media need to be deliberately arranged, and even those deliberately arranged in transition zone 406 may not be given a highly structured arrangement. Thus, the articles of bio-film media of transition layer 406 may be loosely arranged so that they facilitate, but need not follow, a highly structured organization of organized zone 404. In other embodiments, however, the transition layer 406 may be eliminated entirely by only providing highly structured arrangements of bio-film media for organized zone 402.

Figure 5:
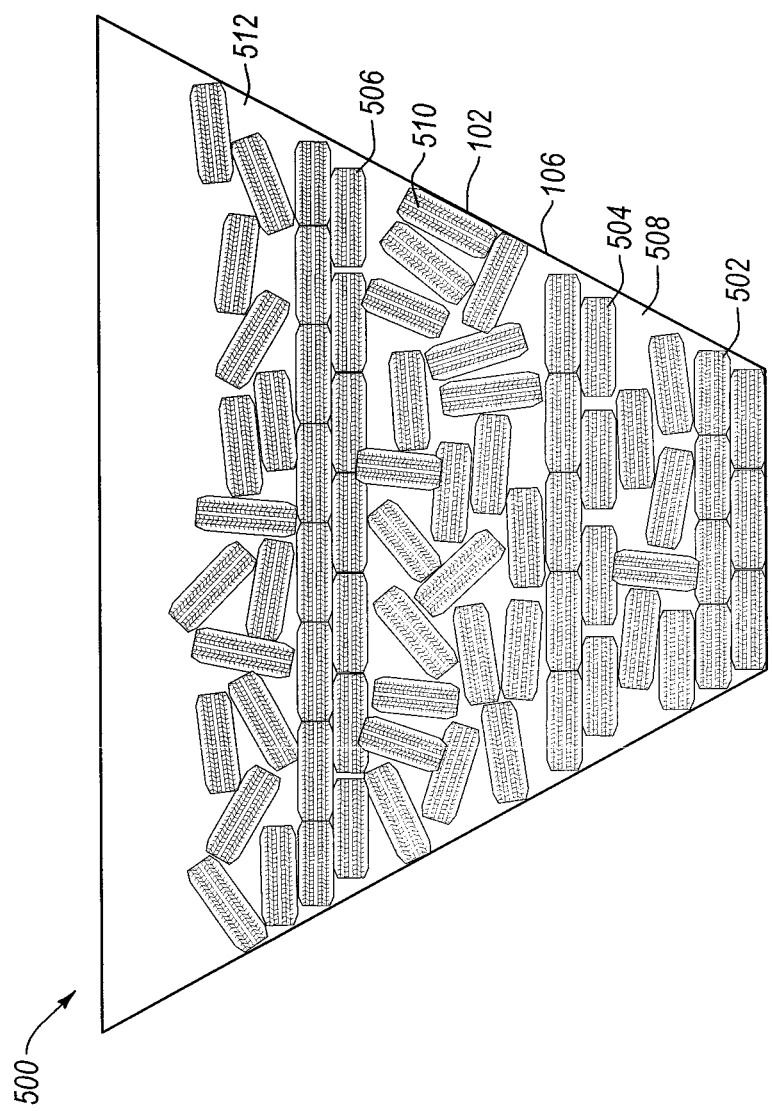
FIG. 5 illustrates a side view of an example embodiment of a waste treatment apparatus with an example arrangement of bio-film media.

Just as the location of the various zones within the container may vary, the number of organized zones, random zones, and/or transition zones within the container may also vary from one embodiment to the next. For example, as illustrated in the example waste treatment apparatus 500 of FIG. 5, there may be a plurality of organized zones 502, 504, and 506 separated by a plurality of random zones 508, 510, and 512, although any combination of numbers of different organized zones or random zones is contemplated. FIG. 5 illustrates one example embodiment containing a plurality of alternating organized zones and random zones, starting with an organized zone 502 at the bottom of container 102. Adjacent, and above, organized zone 502 is a random zone 508, which has another organized zone 504 thereabove. Directly above organized zone 504 is another random zone 510, and random zone 510 supports the last organized zone 506 which is positioned above random zone 510. Finally, a final random zone 512 is located on top of the organized zone 506.

The arrangement of the various zones with respect to one another may vary from one embodiment to the next. The use of transition zones is one way in which the zone arrangements may vary. For example, FIG. 5 illustrates one example embodiment where the organized zones 504 and 506 are not necessarily supported by a transition zone. In this embodiment, the bio-film media may optionally be coupled together or otherwise restrained such that less of a supporting foundation is required under the organized zone. For instance, a restraint mechanism may, in addition or as an alternative to restraining buoyant movement of a lower zone, provide a foundation for a higher zone. In another embodiment, there may be transition zones between organized zones 502, 504 and/or 506 and random zones 508, 510 and/or 512.

In addition to the optional use of transition zones, the order of the various zones within the container is another way in which the zone arrangement may vary. FIG. 5 shows one example embodiment where the order, beginning at the bottom of the container, starts with an organized zone 502 and ends with a random zone 512. In another embodiment, the first zone, beginning at the bottom of the container, may be a random zone and the last zone may be an organized zone. Alternatively, the top and bottom zones may also be of the same type.

FIG. 5 generally illustrates the various organized and random zones, with each having generally the same height. It will be appreciated in view of the disclosure herein that this is merely exemplary. In particular, the size (e.g., height, depth, etc.) of zones can vary throughout container 102. For instance, in one embodiment, organized zones 502, 504 and 506 may all have a similar height, while one or more of random zones 508, 510 and 512 may have a height substantially different than that of the organized zones. Of course, one or more of the organized zones may have different heights (e.g., one has two rows, one has eight rows, one has sixteen rows, one uses small tires while another uses larger tires, etc.), and the random zones may similarly have different depths of randomly placed bio-film media.

Not only may the zone arrangement vary in the vertical arrangement from the top to bottom of the container, but the zone arrangements may also vary from side to side. For example, FIG. 5 illustrates one example embodiment where each respective zone has a width substantially equal to the width of the container at the vertical location of the zone. In another example embodiment, a zone may only have a width equal to a fraction of the width of the container at the vertical or other location of the zone.

Figure 6A:
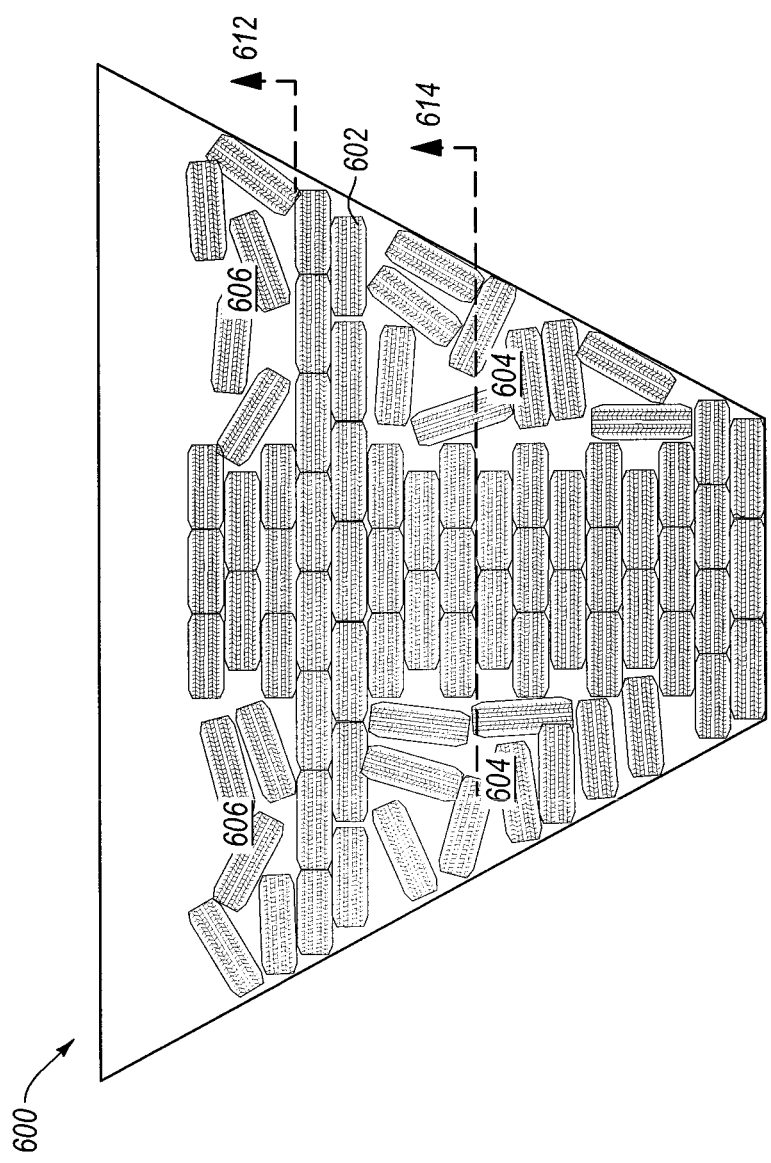
FIG. 6A illustrates a side view an example embodiment of a waste treatment apparatus with an example arrangement of bio-film media.
Figure 6B:
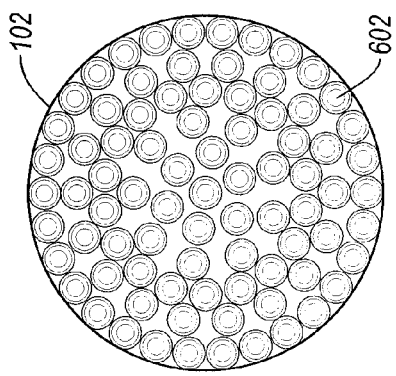
FIG. 6B illustrates a cross-sectional view of an example waste treatment apparatus showing an example cross-sectional arrangement of bio-film media.
Figure 6C:
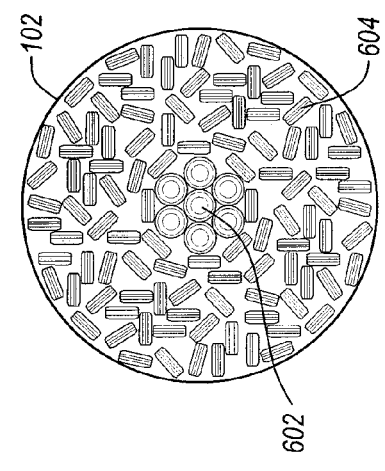
FIG. 6C illustrates a cross-sectional view of an example waste treatment apparatus showing an example cross-sectional arrangement of bio-film media.

When varying the widths and the heights of each of the zone layers as described herein, other example configurations of bio-film media are possible. FIG. 6A shows another example embodiment of a bio-film media arrangement within an example waste treatment apparatus 600. In FIG. 6A, the organized zones are disposed in a manner to create a cross-shaped organized zone arrangement 602 that separates two random zones 604 and 606. FIGS. 6B and 6C show cross-sectional views at planes 612 and 614, respectively. As will be appreciated, the width of the various layers can thus vary in any desirable manner. For example, as shown in FIG. 6B, a width of organized zone 602 may be substantially the width of the enclosing container. As shown in FIG. 6C, however, the width of organized zone 602 may be much less (e.g, a three-tire diameter, approximately a third the diameter of the container, etc). Indeed, in some embodiments, a layer may have a width of a single tire, or even a fraction of a tire, such as where a tire has been cut in half.

Figure 7C:
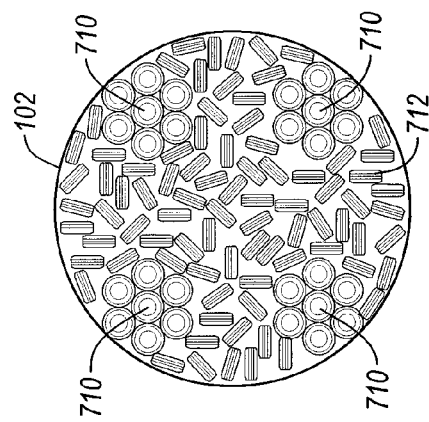
FIG. 7C illustrates a cross-sectional view of an example waste treatment apparatus showing an example cross-sectional arrangement of bio-film media.
Figure 7B:
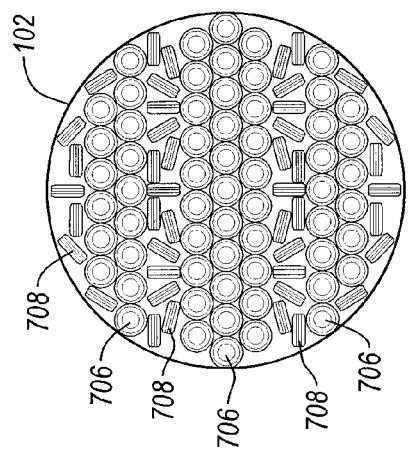
FIG. 7B illustrates a cross-sectional view of an example waste treatment apparatus showing an example cross-sectional arrangement of bio-film media.
Figure 7A:
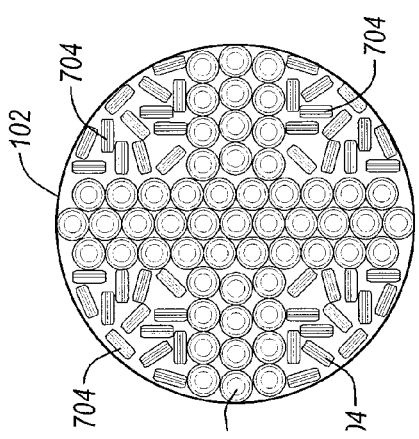
FIG. 7A illustrates a cross-sectional view of an example waste treatment apparatus showing an example cross-sectional arrangement of bio-film media.

As described herein and suggested by the cross-sectional views of the waste treatment apparatus in FIGS. 6B and 6C, other example zone arrangements are possible. FIGS. 7A to 7C provide, for example, various additional cross-sectional views that may be possible, although they are merely a small sample of different types of arrangements of bio-film media contemplated as within the scope of the present invention. For example, FIG. 7A illustrates a cross-sectional zone arrangement where the organized zone 702 makes a cross-shaped pattern surrounded by various random zones 704. Another example, shown in FIG. 7B, illustrates a cross-sectional zone arrangement where the organized zones 706 make three generally horizontal rows separated by generally horizontal random zones 708. Lastly, FIG. 7C illustrates another example cross-sectional zone arrangement where organized zones 710 are formed as pockets that can be fully or partially surrounded by a random zone 712.

In addition to the cross-sectional zone arrangements shown in FIGS. 7A to 7C, other example cross-sectional zone arrangements are possible. For instance, an organized zone may be arranged along an inner perimeter of the container, or the layers may form a target-type pattern. Other example cross-sectional zone arrangements may take any form in order to direct the flow of waste through the container, support various elements within the container, or simply reduce the time and expense involved in arranging the bio-film media.

In general, waste may be inserted into container 102—whether by pump, gravity feed, or some other mechanism—with additional water, so that both can flow through container 102 and allow bacteria on the bio-film media to break it down and neutralize the waste. The water may also provide a self-cleaning effect. In particular, as waste collects on the bio-film media, the gradual flow of fluid through container 102 may clear off collected material and tend to facilitate movement of the material through container 102. The voids in the bio-film media may also facilitate such movement, thus also preventing clogging and blocking that is customary in solid-shaped bio-film media. To further facilitate and expedite gas production, aged solids may be introduced with the waste or otherwise in addition to the waste.

While the sizes of the bio-film media in FIGS. 3-7C are all generally shown as the same size, and with randomly oriented bio-film media aligned to illustrate the tread of example tires that are one example type of bio-film media, it should be appreciated that this is merely for convenience in illustrating aspects of the present invention, and to avoid obscuring novel aspects described relative to each figure. Indeed, any or all of the various specific embodiments illustrated in FIGS. 3-7C or which may be learned from the practice of the invention described herein, can use a variety of different sizes, shapes, configurations, or combinations thereof, of bio-film media. Further, randomly oriented media may be randomly aligned such that a side, cross-sectional, or other view provides a view of randomly oriented tires (or other media) where the tread is visible, where a central opening is visible, or a combination thereof.

4. Example Method of Arranging Bio-Film Media

Figure 8:
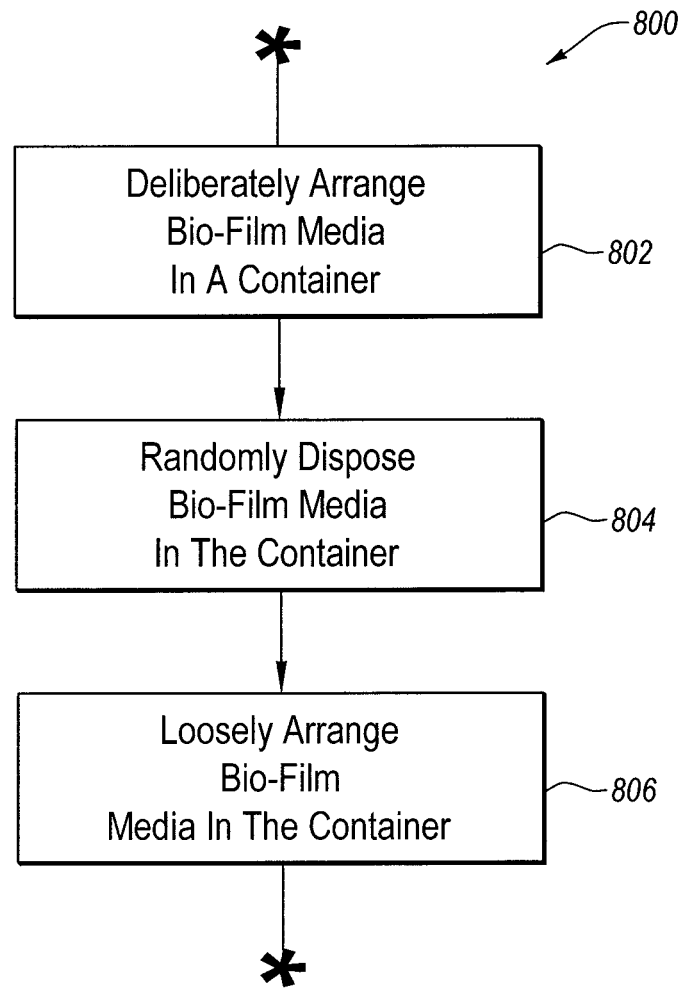
FIG. 8 illustrates an example method of arranging bio-film media within a waste treatment apparatus.

As discussed herein, as a waste treatment process begins, it may involve the use of a waste treatment apparatus having bio-film media that was previously arranged in an organized or random fashion, or in a combination thereof. FIG. 8 illustrates one example method of arranging the bio-film media within the container such that the waste treatment process can begin. Of course, as bio-film media degrades or shifts, additional bio-film media may be introduced, so the method should not be construed as necessarily occurring prior to beginning of the waste treatment process.

As but one example, a method 800 is provided for arranging bio-film media within a container. In such a method, bio-film media can be deliberately arranged in the container (act 802). Such a deliberate arrangement can include, for example, creating an organized arrangement where all, or substantially all, of the articles of bio-film media are placed in substantially deliberate locations with respect to other articles of bio-film media. For instance, act 802 can create the organized layer 302 of bio-film media illustrated in FIG. 3. Act 802 may also include arranging the bio-film media outside of the container, and then inserting the arranged bio-film media in to the container, or any other manner of arranging the bio-film media such that it has or maintains a deliberate arrangement while in the container. In some embodiments, act 802 also includes at least partially filling the container. For instance, during or after forming organized layer 302 of FIG. 3, water may be placed in the container to partially fill the container up to, for example, the top of organized layer 302, although more or less water could also be added. Adding water or another fluid as part of act 802 may also help to arrange the bio-film media as it can produce a buoyancy that may make it easier to move the bio-film media.

In addition, or as an alternative, to the deliberate arrangement of bio-film media in act 802, method 800 may include randomly disposing bio-film media within the container (act 804). For example, with respect to FIG. 3, random layer 304 may be fully or partially created. In such an example, the random layer is optionally adjacent to an organized layer, such that both the random layer and the organized layer each partially fill the container. Collectively, the random and organized layer may fully, or substantially fully, fill the container, or may also only partially fill the container. In other embodiments, act 802 may repeated multiple times (e.g., to produce multiple organized zones), act 804 may be repeated multiple times (e.g., to produce multiple random zones), act 802 may be excluded (e.g., to fill a container with randomly oriented bio-film media), and/or act 804 may be excluded (e.g., to fill a container with only one or more organized zones).

In some cases, the exemplary method 800 may also include additional acts in addition to those of deliberately arranging 802 and/or randomly disposing 804 the bio-film media within the container. For example, as noted above, acts 802 and 804 may be repeated multiple times. Additionally, or alternatively, the method may include leveling or loosely arranging bio-film media within the container (act 806). In one example embodiment, and as discussed herein, the process of leveling the bio-film media may occur subsequent to randomly disposing bio-film media in act 804 and prior to deliberately arranging the bio-film media in act 802. For instance, leveling 806 bio-film media within the container may occur by taking top-most articles of randomly-oriented bio-film media, and for those that are furthest out of horizontal alignment, leveling them in a substantially horizontal alignment to facilitate placement of a deliberately arranged, highly-organized layer of bio-film media. Thus, leveling or loosely arranging bio-film media may also create one or more transition zones, although it may also occur for randomly oriented bio-film media even when there is not an adjacent highly-organized zone. For example, if a random zone is near an upper waste port 114 (FIG. 1), a top-most portion of a random zone may be loosely arranged to facilitate introduction of waste, even without the creation of an organized zone.

Acts 804 and acts 806 may also include, in some embodiments, introducing water or another fluid into the container. For example, before, after, or during the random locating of the bio-film media in act 804, water may be introduced to fully or partially fill a random zone. Similarly, water or another fluid may be placed to fully or partially fill a transition or loosely-arranged zone of bio-film media. In at least one embodiment, partially filling the container facilitates creating a loose arrangement of bio-film media as the buoyancy of the bio-film media may make it easier to move and arrange the bio-film media.

It should be noted that while FIG. 8 illustrates one embodiment that lists certain processes as occurring in a particular order, the disclosed processes may be performed in various other orders as well and the scope of the invention is not limited to the example disclosed in FIG. 8. For instance, in another example embodiment, the randomly disposing 804 of bio-film media, and the leveling 806 of bio-film media within the container may precede deliberately arranging 802 the bio-film media. Moreover, deliberately arranging 802 the bio-film media, randomly disposing 804 the bio-film media, and/or leveling 806 the bio-film media may be repeated several times while filling the container with bio-film media. Moreover, each of the various specific acts in method 800 are considered optional and are not required for all embodiments of the present invention.

In addition to the order of the processes, each process may be achieved using a variety of techniques. For example, deliberately arranging 802 the bio-film media may be achieved in various ways. In one example embodiment, the bio-film media is deliberately arranged by hand, or in other words, a worker may manually arrange the bio-film media within the container. In another example embodiment, the bio-film media can be arranged using machinery, such as a crane or other device that can lift and place the bio-film media approximately in a specified area. Various other techniques for deliberately arranging the bio-film media may include any process that is capable of handling the bio-film media and arranging the bio-film media in an organized fashion, and typically in an individual fashion such that consideration is given to the placement and location of all bio-film media within the organized zone. Frequently, such organized zones will have a desired bio-film media density and/or spacing, although such density or spacing may also vary within a zone.

In connection with the technique used to deliberately arrange the bio-film media, the location of arrangement may vary from one embodiment to the next. For example, in one embodiment the deliberate arrangement of the bio-film media may occur inside the container. In another example embodiment, the bio-film media may be deliberately arranged outside the container and subsequently positioned within the container. In one embodiment, the deliberately arranged bio-film media may be secured together as to facilitate the transport of the deliberately arranged bio-film media from outside the container to inside the container. Such bio-film media may, for example, be positioned in a wire basket and lowered into the container, and such basket may then remain in the container with the bio-film media. Media arranged in such a basket may also be randomly placed, and not be deliberately placed in any particular arrangement.

Not only can the technique of deliberately arranging the bio-film media vary, but the technique of randomly disposing bio-film media (act 804) may also vary. In one example embodiment, the bio-film media is randomly disposed in the container by randomly dumping the bio-film media into the container. In one embodiment, a truck, or other transport equipment, holding bio-film media is positioned proximate the container and dumps a plurality of bio-film media into the container. Multiple loads can be used to create a single random layer, or each load may be considered its own random layer or zone. In another embodiment, a stack of bio-film media may be located proximate the container and a bulldozer, or similar device, pushes the bio-film media into the container, or a crane handles a stack of bio-film media and drops the stack into the container where it can be randomly oriented. In other example embodiments, the bio-film media may be manually thrown into the container, dropped into the container using machinery, or otherwise randomly introduced in the container using any technique that does not individually arrange the bio-film media to a desired location and/or orientation.

As with the various techniques for deliberately arranging and randomly disposing the bio-film media, loosely arranging bio-film media (act 806) may be accomplished using a variety of techniques. In one example embodiment, workers manually arrange some of the bio-film media to produce a substantially level foundation, such that loosely arranging bio-film media includes leveling at least a portion of the bio-film media. For instance, an uppermost portion of randomly oriented bio-film media may be leveled by taking those most out of alignment and re-orienting them to be substantially in alignment. Other bio-film media that is substantially in alignment may be left in place or have their locations shifted (e.g., to make room for out of alignment articles), but may remain in substantially the same orientation. In other example embodiments, a variety of machinery and other devices may be used to level the bio-film media. In other cases, additional bio-film media not already a part of a random layer may be added in a loosely-organized fashion. Thus, leveling may occur with respect to bio-film media already present in the container (e.g., rearranging some to form a generally level foundation), but may additionally, or in the alternative, include the introduction of additional bio-film media to the container in order to facilitate the leveling of the bio-film media.

Notably, while loosely arranging bio-film media (act 806) may thus be similar in some regards to deliberately arranging bio-film media (act 802), it is different in other, significant regards. In particular, the deliberate arrangement of bio-film media (act 802) generally concerns the placement and orientation of all, or substantially all, articles of bio-film media within that layer or zone so as to obtain a desired structure. In contrast, loosely arranging bio-film media (act 806) relates more to the orienting of bio-film media to approximate a desired orientation (and potentially as a suitable support structure for an organized layer), but generally does not concern the individual placement of all individual articles of bio-film media relative to each other (e.g., particular distances apart, particular offset, particular media density, etc.), except to the extent necessary to provide a suitable base for an adjacent layer.

Furthermore, it should be appreciated that each of acts 802, 804 and 806 may include other elements. For instance, in one embodiment, any or all of acts 802, 804, 806 may include separating layers or zones and/or restraining bio-film media within a particular layer or zone. For instance, a mesh, fabric, sheet material, set of pipes, or other mechanism may be placed along a top surface of a zone or layer and used to separate one or more layers from one or more other layers or zones. In still other embodiments, the restraint mechanism may be secured in place to at least partially restrict movement of bio-film media within a zone or layer. In some embodiments, the restraint mechanism may at least partially restrict upward movement, while in other embodiments, the restraint mechanism may form a base or wall for a zone, and thereby at least partially restrict downward, lateral, or vertical movement, or any combination thereof.

The present invention may be embodied in other specific forms without departing from its spirit or essential characteristics. The described embodiments are to be considered, in all respects, illustrative only and not restrictive. Moreover, various elements have been illustrated or described in a particular combination; however, any element may be combined with any one or more other elements or aspects herein, unless otherwise expressly detailed in the detailed description. The scope of the invention is, therefore, indicated by the appended claims rather than by the foregoing description. All changes which come within the meaning and range of equivalency of the claims are to be embraced within their scope.

What is claimed is:

1. An anaerobic waste treatment apparatus, comprising:
   a container; and
   a plurality of bio-film media comprised of a plurality of objects movable relative to one another within said container and forming at least a portion of a torus-like shape, said objects including one or more attachment surfaces configured to support anaerobic bacteria growth that facilitates degradation of waste material introduced into said container, and one or more voids for accumulating the waste material as the waste material pass through the bio-film media to further degrade the waste material,
   said bio-film media being initially dispersed within said container in a random arrangement, wherein one or more air pockets are formed in random locations between said objects to trap gas produced by the degradation of the waste material such that over time a buildup of the produced gas within said one or more air pockets moves said bio-film media from said random arrangement into a loosely organized arrangement, wherein one or more through paths are formed between said objects to release the produced gas from said one or more air pockets such that the produced gas can be collected and removed from said container.

2. The anaerobic waste treatment apparatus of claim 1, further comprising:
   a first zone of bio-film media disposed within said container; and
   a second zone of bio-film media disposed within said container, wherein at least one of said first zone or said second zone of bio-film media includes said bio-film media dispersed in said random arrangement.

3. The anaerobic waste treatment apparatus of claim 2, wherein said first zone is a substantially horizontal zone of bio-film media located below said second zone of bio-film media.

4. The anaerobic waste treatment apparatus of claim 1, further comprising:
   a transitional zone of bio-film media adjacent to said bio-film media dispersed in said random arrangement, wherein said transitional zone of bio-film media creates a foundation; and
   a substantially horizontal zone of bio-film media adjacent to said transitional zone of bio-film media, wherein said substantially horizontal zone of bio-film media is supported by said foundation.

5. The anaerobic waste treatment apparatus of claim 1, wherein said bio-film media dispersed in said random arrangement include tires.

6. The anaerobic waste treatment apparatus of claim 1, wherein said container is a dug out portion of earth.

7. The anaerobic waste treatment apparatus of claim 6, wherein said dug out portion of earth is lined with plastic, concrete, metal, earthen material, clay, asphalt, organic material, composite material, or a combination thereof.

8. The anaerobic waste treatment apparatus of claim 1, wherein said container is a metal, concrete, fiberglass composite, or plastic tank.

9. The anaerobic waste treatment apparatus of claim 1, further comprising:
- at least one a waste pump in fluid communication with said container; and
- at least one waste pipe coupled to said waste pump, wherein said waste pipe extends from said waste pump and into said container, the waste pipe further comprising:
  - one or more upper waste ports configured to introduce waste material into an upper portion of said container and above said bio-film media dispersed in said random arrangement; and
  - one or more lower waste ports configured to introduce waste material into a lower portion of said container and below said bio-film media dispersed in said random arrangement.

10. The anaerobic waste treatment apparatus of claim 1, wherein said materials comprise a plurality of tires having various different sizes.

11. The anaerobic waste treatment apparatus of claim 1, wherein a cross-section of said container includes an organized zone of materials in a cross-like shape.

12. The anaerobic waste treatment apparatus of claim 1, wherein a cross-section of said container includes a central organized zone of materials surrounded by a random zone of materials.

13. A method of arranging bio-film media in an anaerobic waste treatment apparatus, the method comprising:
- creating a plurality of zones within a container of a waste treatment apparatus, wherein creating said plurality of zones includes:
- creating a first zone of bio-film media; and
- creating a second zone of bio-film media, wherein at least one of said first zone or second zone of bio-film media includes a plurality of objects forming at least a portion of a torus-like shape and is created by randomly disposing the bio-film media in said container such that one or more air pockets are formed in random locations between said objects to trap gas produced by degradation of waste material in said container such that over time a buildup of the produced gas within said one or more air pockets moves said bio-film media from said random arrangement into a loosely organized arrangement, wherein one or more through paths are formed between said objects to release the produced gas from said one or more air pockets such that the produced gas can be collected and removed from said container.

14. The method of claim 13, further comprising:
- leveling only a portion of the randomly disposed bio-film media to form a transitional layer of a random zone; and
- deliberately arranging bio-film media into an organized zone proximate to said randomly random zone and supported on said transitional layer.

15. The method of claim 14, wherein said deliberately arranging bio-film media further comprises:
- organizing bio-film media outside said container;
- coupling said organized bio-film media together to form an organized structure of bio-film media; and
- transporting said organized structure of bio-film media into said container to form an organized zone of bio-film media.

16. The method of claim 13, wherein randomly disposing the bio-film media in said container further comprises:
- dumping the bio-film media into said container from a motorized vehicle.

17. The method of claim 13, wherein randomly disposing the bio-film media in said container comprises:
- pushing the bio-film media into said container with a motorized vehicle.

18. The method of claim 13, wherein randomly disposing the bio-film media in said container further comprises:
- dropping bio-film media into the container with machinery capable of lifting the bio-film media.

19. An anaerobic waste treatment apparatus, comprising:
- a container comprising a dug out portion of earth; and
- a plurality of bio-film media comprising a plurality of tires including one or more attachment surfaces configured to support anaerobic bacteria that degrade waste material introduced into said container, and one or more voids for accumulating the waste material as the waste material pass through the bio-film media to further degrade the waste material,
- said tires being initially dispersed within said container in a random arrangement, wherein one or more air pockets are formed in random locations between said tires to trap gas produced by the degradation of the waste material such that over time a buildup of the produced gas within said one or more air pockets moves said bio-film media from said random arrangement into a loosely organized arrangement, wherein one or more through paths are formed between said tires to release the produced gas from said one or more air pockets such that the produced gas can be collected and removed from said container.

20. The anaerobic waste treatment apparatus of claim 19, wherein a cross-section of said container includes an organized zone of tires in a cross-like shape.

21. The anaerobic waste treatment apparatus of claim 19, wherein a cross-section of said container includes a central organized zone of tires surrounded by a random zone of tires.

* * * * *